(12) United States Patent
Chen et al.

(10) Patent No.: US 9,983,805 B1
(45) Date of Patent: May 29, 2018

(54) MEMORY MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventors: Chien-Wen Chen, Taoyuan (TW); Yi-Chang Hsieh, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days. days.

(21) Appl. No.: 15/655,895

(22) Filed: Jul. 21, 2017

(30) Foreign Application Priority Data

Jun. 2, 2017 (TW) .............................. 106118213 A (51) Int. Cl.
*G11C 7/00* (2006.01)
*G06F 3/06* (2006.01)
*G06F 12/02* (2006.01)

(52) U.S. Cl.
CPC ............ *G06F 3/0616* (2013.01); *G06F 3/065* (2013.01); *G06F 3/0619* (2013.01); *G06F 3/0652* (2013.01); *G06F 3/0679* (2013.01); *G06F 12/0253* (2013.01); *G06F 2212/7205* (2013.01)

(58) Field of Classification Search
CPC ...... G06F 3/0616; G06F 3/0619; G06F 3/065; G06F 3/0652; G06F 3/0679; G06F 12/0253; G06F 2212/7205
See application file for complete search history.

(56) References Cited

U.S. PATENT DOCUMENTS 9,652,330 B2 * 5/2017 Yeh ..................... G06F 11/1441
9,721,669 B2 * 8/2017 Chu ....................... G11C 16/22
9,823,844 B2 * 11/2017 Khon ..................... G06F 3/0604

* cited by examiner

*Primary Examiner* — Pho M Luu
(74) *Attorney, Agent, or Firm* — JCIPRNET (57) ABSTRACT

A memory management method, and a memory control circuit unit and a memory storage apparatus using the same are provided. The method includes recording a valid data count of each physical erasing unit, and identifying a plurality of first physical erasing units, wherein the valid data count of each first physical erasing unit is between a first predetermined value and a second predetermined value. The method also includes selecting a physical erasing unit from the first physical erasing units for performing a garbage collection operation if the number of the first physical erasing units meets a predetermined condition.

20 Claims, 9 Drawing Sheets

MEMORY MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 106118213, filed on Jun. 2, 2017. The entirety of the above-mentioned patent application is hereby incorporated by reference herein and made a part of this specification.

BACKGROUND

Technical Field

The present invention relates to a memory management method for a rewritable non-volatile memory, and a memory control circuit unit and a memory storage apparatus using the method.

Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

In general, a memory storage apparatus having the rewritable non-volatile memory module can release available physical erasing units by performing a garbage collection operation (a.k.a. a valid data merging operation). For example, the traditional garbage collection operation refers to select one physical erasing unit having the least valid data from among the physical erasing units, and copy the valid data to another physical erasing unit in order to release the available physical erasing units.

However, when the host system updates data in a wide range of logical addresses, since the range for updating the logical addresses is quite large, there may only be part of physical programming units stored with valid data in many of the physical erasing units. In this case, the valid data of these physical erasing units may not be the least and thus will not be selected as the target for performing the garbage collection operation. Consequently, the number of available physical erasing units in the rewritable non-volatile memory is reduced thereby affecting performance for executing write commands.

Accordingly, finding a way to select the physical erasing units for performing the garbage collection operation so as to improve a writing performance and extend a lifetime of the rewritable non-volatile memory is one of goals for persons skilled in the art to achieve.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory management method, a memory storage apparatus and a memory control circuit unit, which are capable of improving the writing performance and extending the lifetime of the rewritable non-volatile memory.

According to an exemplary embodiment, a memory management method for a rewritable non-volatile memory module is provided. The rewritable non-volatile memory module has a plurality of physical erasing units and each of the physical erasing units has a plurality of physical programming units. The memory management method includes: recording a valid data count of each physical erasing unit, and identifying a plurality of first physical erasing units, wherein the valid data count of each first physical erasing unit is between a first predetermined value and a second predetermined value. The memory management method further includes selecting a second physical erasing unit from the first physical erasing units if the number of the first physical erasing units meets a predetermined condition, copying a plurality of valid data in the second physical erasing unit to a third physical erasing unit, and performing an erasing operation for the second physical erasing unit.

According to an exemplary embodiment, a memory control circuit unit configured to control a rewritable non-volatile memory module is provided. The rewritable non-volatile memory module includes a plurality of physical erasing units, and each of the physical erasing units has a plurality of physical programming units. The memory control circuit unit includes a host interface, a memory interface and a memory management circuit. The host interface is configured to couple to a host system, the memory interface is configured to couple to the rewritable non-volatile memory module, and the memory management circuit is coupled to the host interface and the memory interface. The memory management circuit is configured to record a valid data count of each physical erasing unit, and identify a plurality of first physical erasing units, wherein the valid data count of each first physical erasing unit is between a first predetermined value and a second predetermined value. The memory management circuit is further configured to select a second physical erasing unit from the first physical erasing units if the number of the first physical erasing units meets a predetermined condition, give a command sequence for copying a plurality of valid data in the second physical erasing unit to a third physical erasing unit, and perform an erasing operation for the second physical erasing unit.

According to an exemplary embodiment, a memory storage apparatus, which includes a connection interface unit, a rewritable non-volatile memory module and a memory control circuit unit, is provided. The connection interface unit is configured to couple to a host system. The rewritable non-volatile memory module includes a plurality of physical erasing units and each of the physical erasing units has a plurality of physical programming units. The memory control circuit unit is coupled to the connection interface unit and the rewritable non-volatile memory module. The memory control circuit unit is configured to record a valid data count of each physical erasing unit, and identify a plurality of first physical erasing units, wherein the valid data count of each first physical erasing unit is between a first predetermined value and a second predetermined value.

The memory control circuit unit is further configured to select a second physical erasing unit from the first physical erasing units if the number of the first physical erasing units meets a predetermined condition, copy a plurality of valid data in the second physical erasing unit to a third physical erasing unit, and perform an erasing operation for the second physical erasing unit.

Based on the above, in the memory management method, the memory control circuit unit and the memory storage apparatus according to the embodiments of the invention, the valid data count of each physical erasing unit is recorded so the physical erasing units having the valid data count within a specific range may be identified, and the physical erasing units corresponding to the specific range or the physical erasing units having the smallest valid data count are selected according to the physical erasing units having the valid data count within the specific range for performing the garbage collection operation. As a result, the physical erasing units may be prevented from being ineffectively used due to the part of the physical programming units stored with the valid data, so as to improve the writing performance and extend the lifetime of the rewritable non-volatile memory.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage apparatus (a.k.a. a memory storage system) includes a rewritable non-volatile memory module and a controller (a.k.a. a control circuit unit). The memory storage apparatus is usually configured together with a host system so the host system can write data into the memory storage apparatus or read data from the memory storage apparatus.

Figure 1:
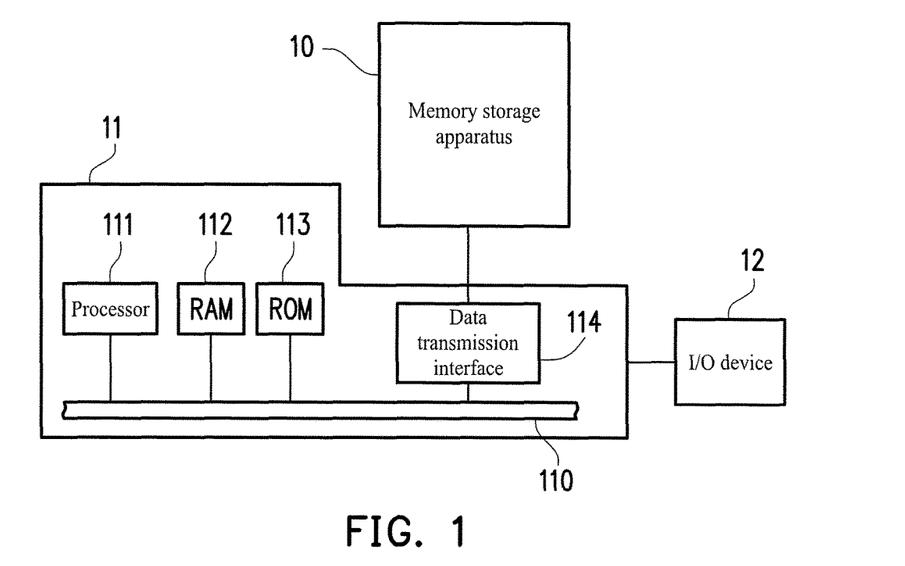
FIG. 1 is a schematic diagram illustrating a host system, a memory storage apparatus and an input/output (I/O) device according to an exemplary embodiment.
Figure 2:
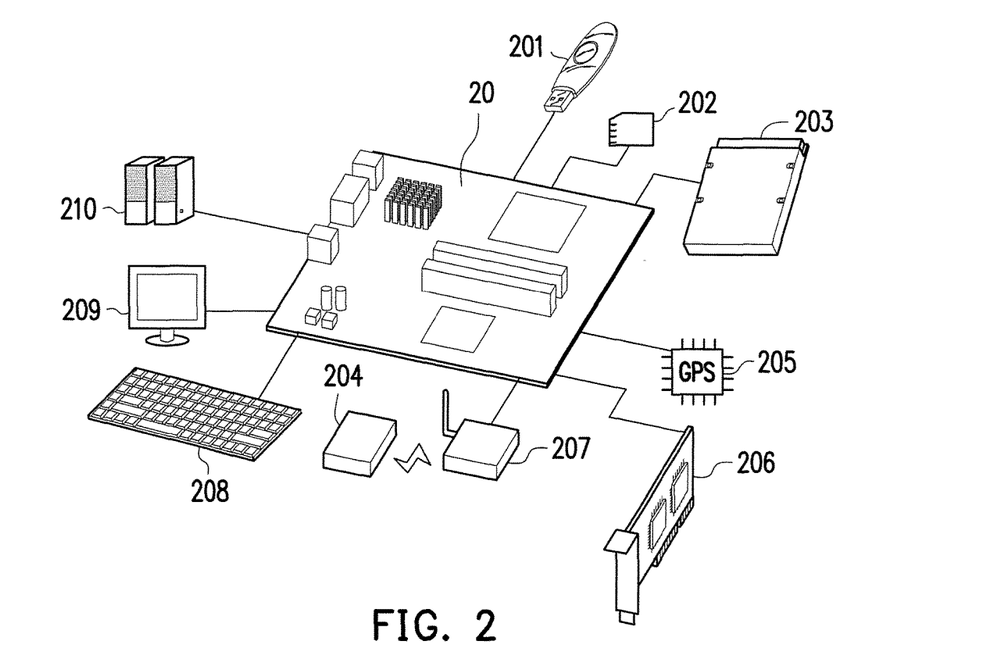
FIG. 2 is a schematic diagram illustrating a host system, a memory storage apparatus and an input/output (I/O) device according to another exemplary embodiment.

FIG. 1 is a schematic diagram illustrating a host system, a memory storage apparatus and an input/output (I/O) device according to an exemplary embodiment, and FIG. 2 is a schematic diagram illustrating a host system, a memory storage apparatus and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage apparatus 10 through the data transmission interface 114. For example, the host system 11 can write data into the memory storage apparatus 10 or read data from the memory storage apparatus 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage apparatus 10 in a wired manner or a wireless manner. The memory storage apparatus 10 may be, for example, a flash drive 201, a memory card 202, a SSD (Solid State Drive) 203 or a wireless memory storage apparatus 204. The wireless memory storage apparatus 204 may be, for example, a memory storage apparatus based on various wireless communication technologies, such as a NFC (Near Field Communication Storage) memory storage apparatus, a WiFi (Wireless Fidelity) memory storage apparatus, a Bluetooth memory storage apparatus, a BLE (Bluetooth low energy) memory storage apparatus (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage apparatus 204 via the wireless transmission device 207.

Figure 3:
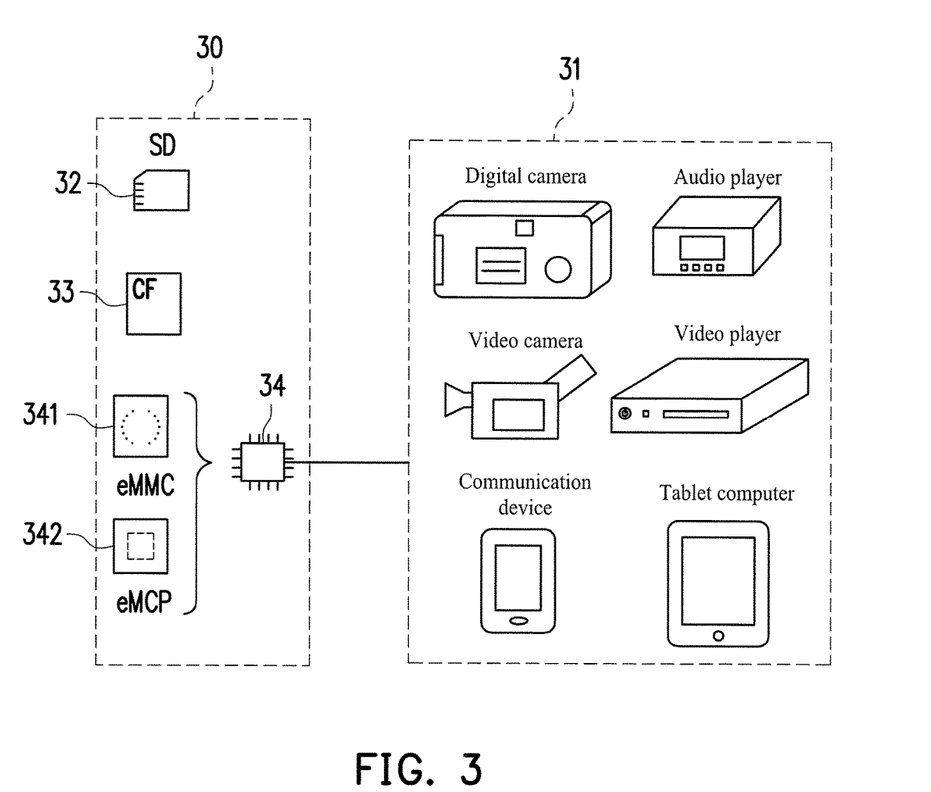
FIG. 3 is a schematic diagram illustrating a host system and a memory storage apparatus according to another exemplary embodiment.

In an exemplary embodiment, aforementioned host system may be any system capable of substantially cooperating with the memory storage apparatus for storing data. Although the host system is illustrated as a computer system in the foregoing exemplary embodiments, nonetheless, FIG. 3 is a schematic diagram illustrating a host system and a memory storage apparatus according to another exemplary embodiment. Referring to FIG. 3, in another exemplary embodiment, a host system 31 may also be a system including a digital camera, a video camera, a communication device, an audio player, a video player or a tablet computer, whereas a memory storage apparatus 30 may be various non-volatile memory storage apparatuses used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
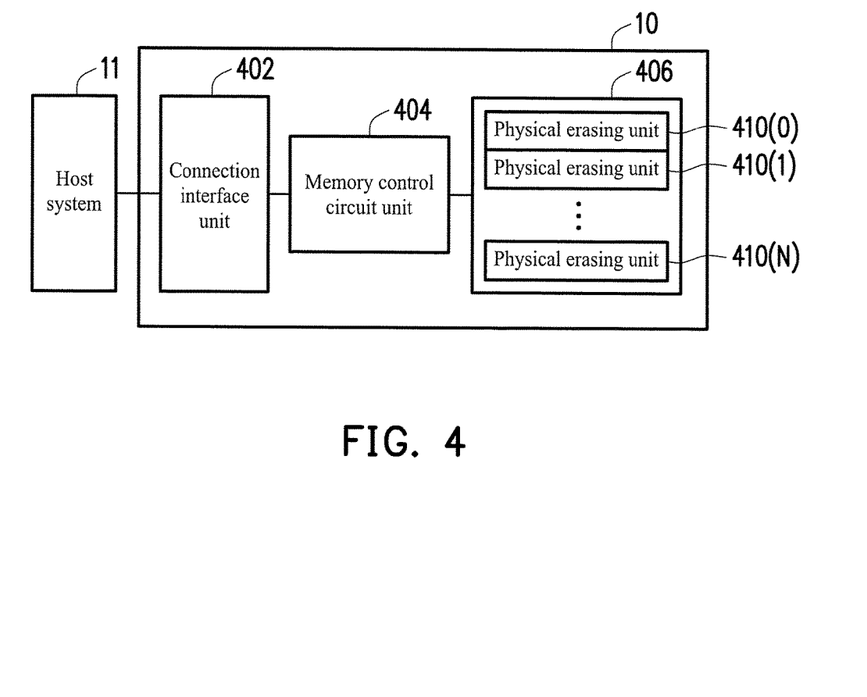
FIG. 4 is a schematic block diagram illustrating a host system and a memory storage apparatus according to an exemplary embodiment.

FIG. 4 is a schematic block diagram illustrating a host system and a memory storage apparatus according to an exemplary embodiment.

Referring to FIG. 4, the memory storage apparatus 10 includes a connection interface unit 402, a memory control circuit unit 404 and a rewritable non-volatile memory module 406.

In the present exemplary embodiment, the connection interface unit 402 is compatible with a Secure Digital (SD) interface standard. Nevertheless, it should be understood that the invention is not limited to the above. The connection interface unit 402 may also be compatible to a SATA (Serial Advanced Technology Attachment) standard, a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited to the above. Each physical erasing unit may be constituted by 64 physical programming units, 256 physical programming units or any number of the physical programming units.

More specifically, the physical erasing unit is a minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a SLC (Single Level Cell) NAND flash memory module (i.e., a flash memory module capable of storing one data bit in one memory cell). However, the invention is not limited to the above. The rewritable non-volatile memory module 406 may also be a MLC (Multi Level Cell) NAND flash memory module, (i.e., a flash memory module capable of storing two data bits in one memory cell), a TLC (Trinary Level Cell) NAND flash memory module (i.e., a flash memory module capable of storing three data bits in one memory cell), other flash memory modules or any memory module having the same features.

Figure 5:
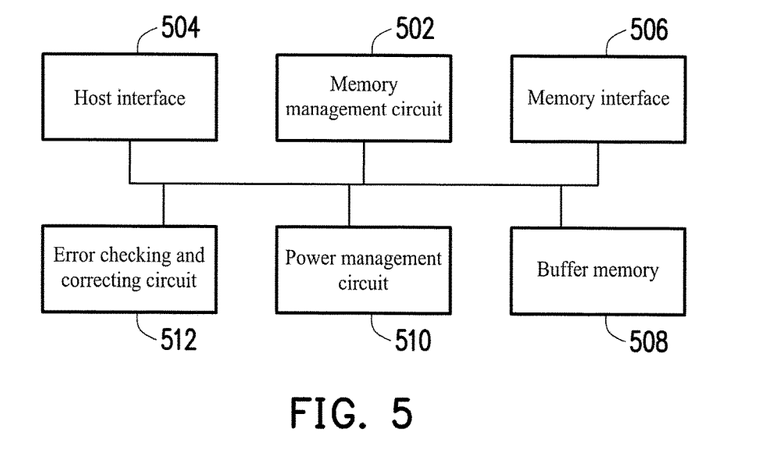
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control instructions and the control instructions are executed to perform various operations such as writing, reading and erasing data during operation of the memory storage apparatus 10.

In the present exemplary embodiment, the control instructions of the memory management circuit 502 are implemented in form of firmware. For instance, the memory management circuit 502 has a microprocessor unit (not illustrated) and a read-only memory (not illustrated), and the control instructions are burnt into the read-only memory. During operation of the memory storage apparatus 10, the control instructions are executed by the microprocessor to perform operations of writing, reading or erasing data.

In another exemplary embodiment of the invention, the control instructions of the memory management circuit 502 may also be stored, in form of program codes, into a specific area (e.g., a system area in the memory module exclusively for storing the system data) of the rewritable non-volatile memory module 406. In addition, the memory management circuit 502 has a microprocessor unit (not illustrated), a ROM (not illustrated) and a RAM (not illustrated). In particular, the ROM has an activate code, which is executed by the microprocessor unit to load the control instructions stored in the rewritable non-volatile memory module 406 to the RAM of the memory management circuit 502 when the memory control circuit unit 404 is enabled. Then, the control instructions are executed by the microprocessor unit to perform operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to give a write command to the rewritable non-volatile memory module 406 in order to write data into the rewritable non-volatile memory module 406; the memory reading circuit is configured to give a read command to the rewritable non-volatile memory module 406 in order to read data from the rewritable non-volatile memory module 406; the memory erasing circuit is configured to give an erase command to the rewritable non-volatile memory module 406 in order to erase data from the rewritable non-volatile memory module 406; and the data processing circuit is configured to process both the data to be written into the rewritable non-volatile memory module 406 and the data read from the rewritable non-volatile memory module 406.

The host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the present invention is not limited to the above. The host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506.

The buffer memory 508 is coupled to the memory management circuit 502 and configured to temporarily store data and commands from the host system 11 or data from the rewritable non-volatile memory module 406.

In an exemplary embodiment, the memory control circuit unit 404 further includes a buffer memory 508, a power management circuit 510 and an error checking and correcting circuit 512.

The power management unit 510 is coupled to the memory management circuit 502 and configured to control a power of the memory storage apparatus 10.

The error checking and correcting circuit 512 is coupled to the memory management circuit 502 and configured to execute an error checking and correcting procedure to ensure the data integrity. Specifically, when the memory management circuit 502 receives a write command from the host system 11, the error checking and correcting circuit 512 generates an ECC code (Error Checking and Correcting Code) for the data corresponding to the write command, and the memory management circuit 502 writes the data and the ECC code corresponding to the write command into the rewritable non-volatile memory module 406. Later, when reading the data from the rewritable non-volatile memory module 406, the memory management circuit 502 also reads the error checking and correcting code corresponding to the data, and the error checking and correcting circuit 512 executes the error checking and correcting procedure for the read data according to the error checking and correcting code.

In the present exemplary embodiment, a low density parity code (LDPC) is implemented by the error checking and correcting circuit 512. However, in another exemplary embodiment, the error checking and correcting circuit 512 may also be implemented by encoding/decoding algorithms including a BCH code, a convolutional code, a turbo code, a bit flipping, etc.

Specifically, the memory management circuit 502 generates an error correction code frame (ECC frame) according to the received data and the corresponding error checking and correcting code (a.k.a. an error correction code) and writes the ECC frame into the rewritable non-volatile memory module 406. Then, when the memory management circuit 502 reads data from the rewritable non-volatile memory module 406, the error checking and correcting circuit 512 can verify the correctness of the read data according to the error correction code in the ECC frame.

Figure 6:
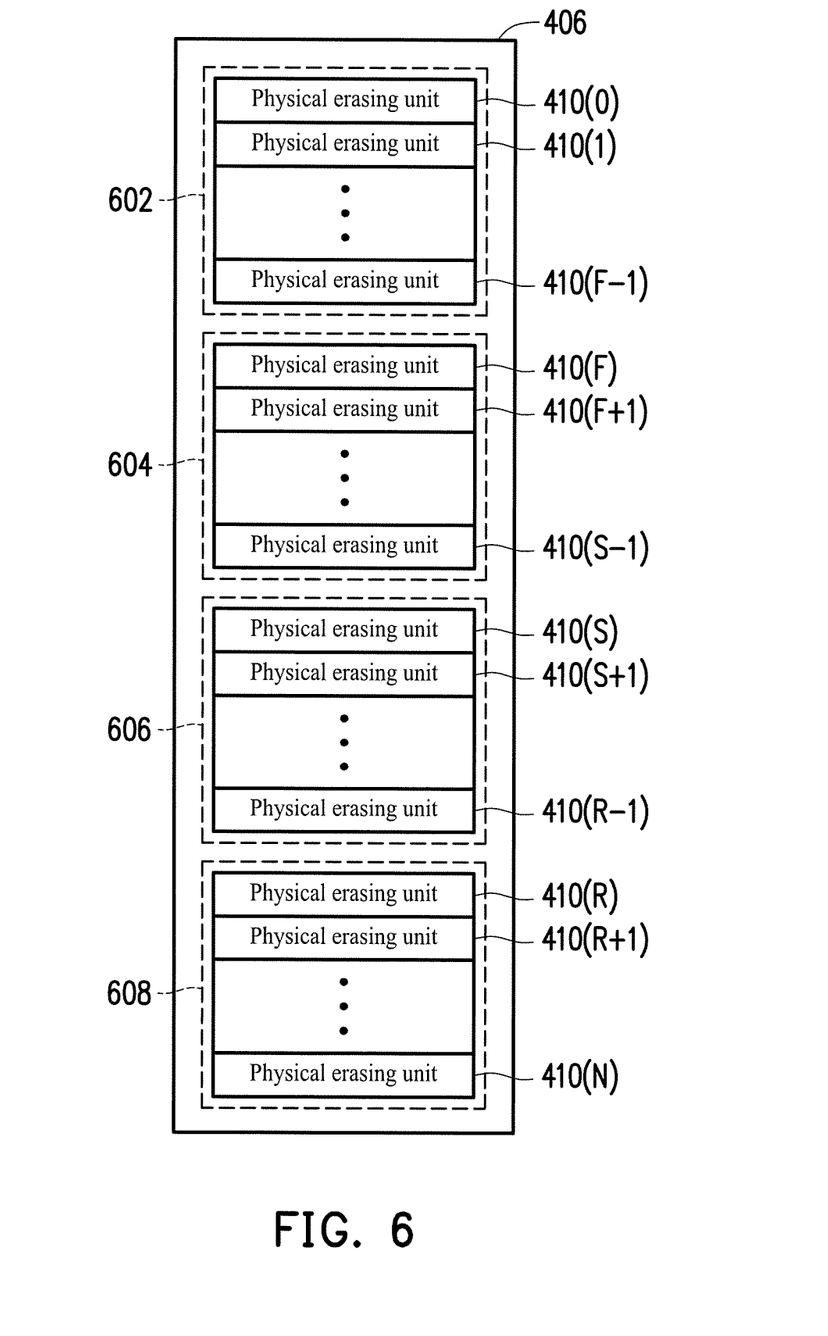
FIG. 6 and FIG. 7 are schematic diagrams illustrating a management of the physical erasing units according to an exemplary embodiment.
Figure 7:
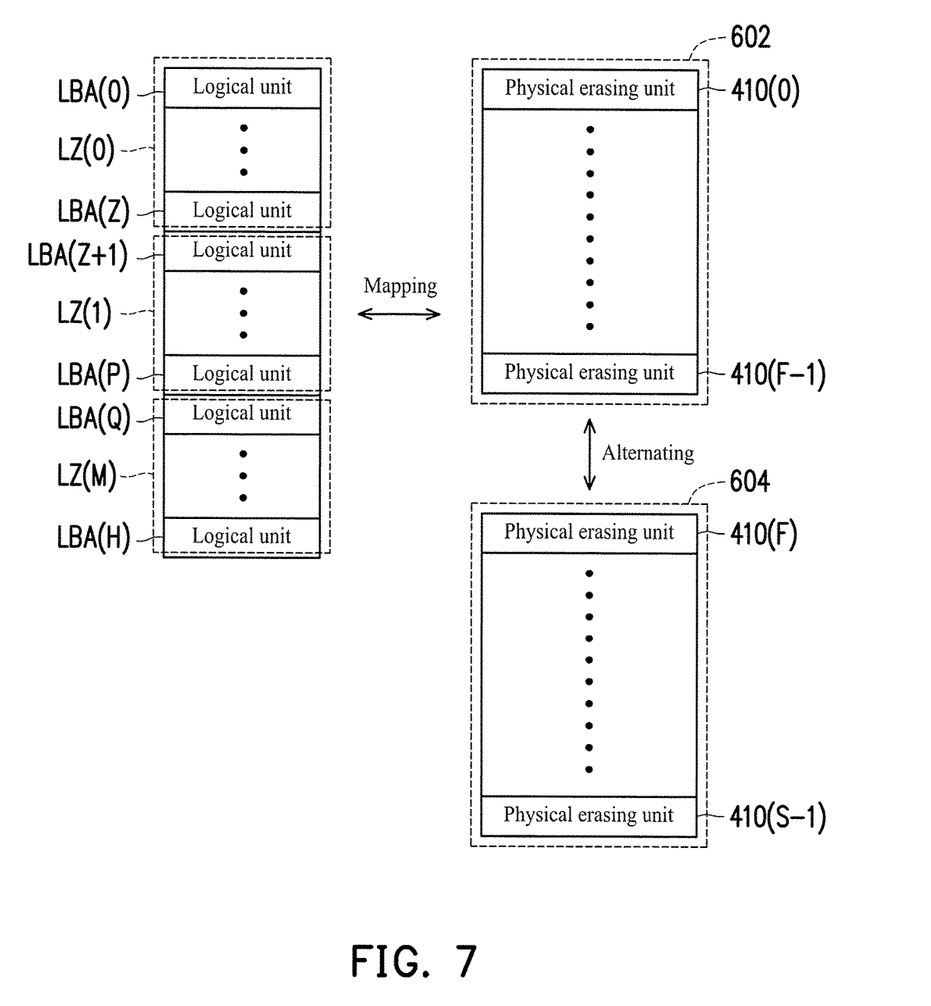

FIG. 6 and FIG. 7 are schematic diagrams illustrating a management of the physical erasing units according to an exemplary embodiment.

It should be understood that terms, such as "get", "retrieve", "group", "divide", "associate" and so forth, are logical concepts which describe operations in the physical erasing units of the rewritable non-volatile memory module 406. In other words, the physical erasing units of the rewritable non-volatile memory module are logically operated so actual positions of the physical units of the rewritable non-volatile memory module are not changed.

In the following description, the operations performed by the memory management circuit 502, the host interface 504, the memory interface 506, the buffer memory 508, the power management circuit 510 and the error checking and correcting circuit 512 may also be referred to as being performed by the memory control circuit unit 404.

In general, before the memory storage apparatus 10 leaves the factory, manufacturers will perform a formatting operation for the memory storage apparatus 10 using a Mass Production tool (MP tool) so as to perform an initialization. Referring to FIG. 6, for example, the memory management circuit 502 performs the initialization to logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units in the data area 602 are regarded as the physical erasing units stored with the data, whereas the physical erasing units in the spare area 604 are used for alternating the physical erasing units in the data area 602. In other words, when the write command and the data to be written are received from the host system 11, the memory management circuit 502 selects the physical erasing units from the spare area 604, and writes the data into the retrieved physical erasing units as for alternating the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if the replacement area 608 still includes normal physical erasing units when the physical erasing units in the data area 602 are damaged, a memory management circuit 502 retrieves the normal physical erasing units from the replacement area 608 for replacing the damaged physical erasing units.

In particular, the numbers of the physical erasing units in the data area 602, the spare area 604, the system area 606 and the replacement area 608 may be different from one another according to the different memory specifications. In addition, it should be understood that, during operation of the memory storage apparatus 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, the memory management circuit 502 configures logical units LBA(0) to LBA(H) for mapping to the physical erasing units in the data area 602, where each of the logical units includes a plurality of logical sub-units for mapping to the physical programming units of the corresponding physical erasing units. Further, when the host system 11 intends to write the data into the logical units or update the data stored in the logical units, the memory management circuit 502 can retrieve one physical erasing unit from the spare area 604 as replacement to the physical erasing units in the data area 602 for writing the data. In the present exemplary embodiment, the logical sub-units may be logical pages or logical sectors.

In order to identify the physical erasing units to which the data of each logical unit is being stored to, the memory management circuit 502 can record a mapping between the logical unit and the physical erasing unit in the present exemplary embodiment. Further, when the host system 11 intends to access the data in the logical sub-unit, the memory management circuit 502 can confirm the logical unit to which the logical sub-unit belongs and access the data in the physical erasing unit mapped to the logical unit. For instance, in the present exemplary embodiment, the memory management circuit 502 stores logical-physical mapping tables into the rewritable non-volatile memory module 406 for recording the physical erasing units mapped to the logical units, and the logical-physical mapping tables are loaded into the buffer memory 508 for maintenance when the memory management circuit 502 intends to the access the data.

It should be noted that, the mapping table is unable to record the mapping relation for all of the logical units because a capacity of the buffer memory 508 is limited. Therefore, in the present exemplary embodiment, the memory management unit 502 can group the logical units LBA(0) to LBA(H) into a plurality of logical zones LZ(0) to LZ(M) and configure one logical-physical mapping table for each of the logical zones. In particular, when the memory management unit 502 intends to update the mapping relation for one specific logical unit, the logical-physical mapping table corresponding to the logical zone to which the logical unit belongs may be loaded into the buffer memory 508 for updating.

It is noted that in the following description, some terms may be replaced with corresponding abbreviations for ease of reading (see Table 1).

TABLE 1

| rewritable non-volatile memory module | RNVM module |
|---|---|
| physical erasing unit | PEU |
| physical programming unit | PPU |
| logical erasing unit | LEU |
| logical programming unit | LPU |
| memory management circuit | MMC |
| memory control circuit | MCC |
| garbage collection operation | GCO |
| valid data count | VDC |

Figure 8:
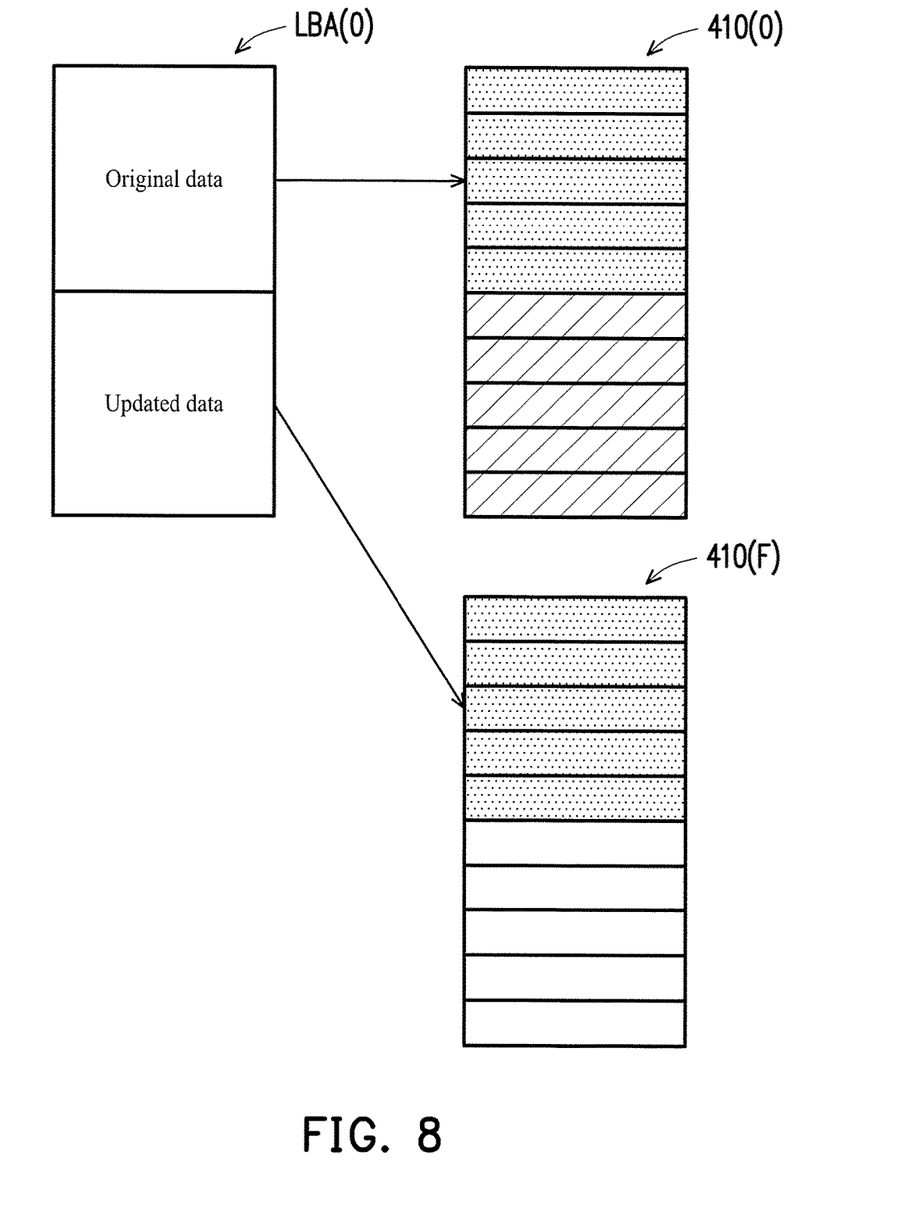
FIG. 8 is a schematic diagram illustrating a data update according to an exemplary embodiment.

FIG. 8 is a schematic diagram illustrating a data update according to an exemplary embodiment.

With reference to FIG. 8, as described above, in the RNVM module 406, what provided for the host system 11 to access are the PEUs in the data area 602, and the user data is stored by the PEUs in the data area 602 and the spare area 604 in an alternating manner. For example, given that original data of the logical unit LBA(0) is programmed into the PEU 410(0), when the host system 11 updates data in part of the logical addresses in the logical unit LBA(0), updated data will be programmed into another PEU 410(F). In this case, part of the data in the PEU 410(0) is marked as invalid (see slash portions) and part of the data marked as valid (see dotted portions). In particular, for the PEUs having a VDC being a median value (i.e., the PEUs in which part of data has been updated) in the data area 602, because said VDC is not the least, if only the PEUs having a smallest VDC are selected for performing the GCOs, those PEUs having the VDC being the median value are less likely merged. Consequently, the number of the available PEUs is reduced so the available PEUs for performing the writing operation are also reduced, thereby affecting performance for performing the writing operation. In the present exemplary embodiment, during the GCO, the MMC 502 selects the PEUs having the smallest VDC or the PEUs having the VDC being the median value for performing a valid data merging operation according to the VDC of each PEU in the data area 602.

For example, the MMC 502 records the VDC of each PEU, and identifies PEUs having the VDC between a first predetermined value and a second predetermined value (hereinafter, referred to as first PEUs) according to the VDCs of the PEUs in the data area 602. Herein, the first predetermined value and the second predetermined value are set according to a capacity of the PEU. For example, the first predetermined value is 33% of the capacity of the PEU and the second predetermined value is 80% of the capacity of the PEU. Nonetheless, it should be understood that, settings for the first predetermined value and the second predetermined value are limited to the above. For example, the first predetermined value may also be 30% of the capacity of the PEU and the second predetermined value may also be 90% of the capacity of the PEU.

In the present exemplary embodiment, the MCC 502 determines whether the number of the PEUs having the VDC between the first predetermined value and the second predetermined value meets a predetermined condition. If the number of the PEUs having the VDC between the first predetermined value and the second predetermined value meets the predetermined condition, the MMC 502 selects a PEU (hereinafter, referred to as a second PEU) from the PEUs having the VDC between the first predetermined value and the second predetermined value for performing the GCO, so as to copy the valid data in the second PEU to an empty PEU in the spare area 604 (hereinafter, referred to as a third PEU) and perform an erasing operation for the second PEU. For example, the MMC 502 randomly selects one PEU from the PEUs having the VDC between the first predetermined value and the second predetermined value. If the number of the PEUs having the VDC between the first predetermined value and the second predetermined value does not meet the predetermined condition, the MMC 502 selects the PEU having the smallest VDC (hereinafter, referred to as a fourth PEU) from the data area 602 for performing the GCO, so as to copy the valid data in the fourth PEU to the third PEU and perform the erasing operation for the fourth PEU.

Figure 9:
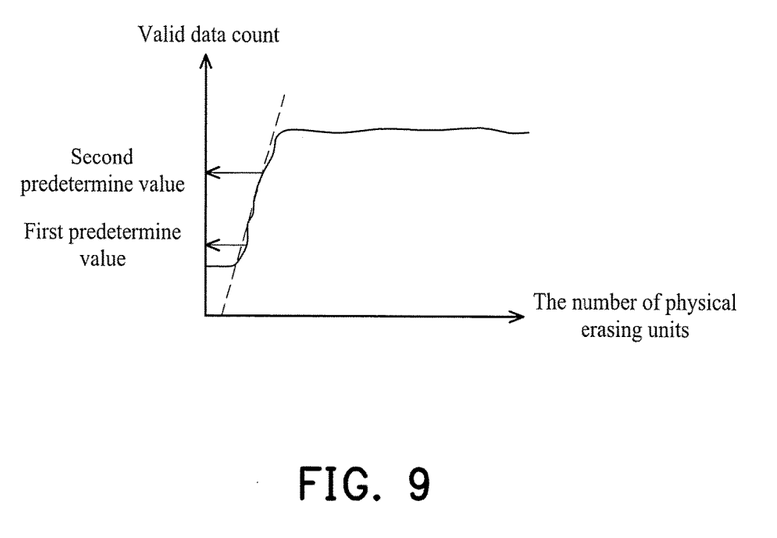
FIG. 9 illustrates a sorted valid data count distribution according an exemplary embodiment.

For example, the MMC 502 can generate a VDC distribution according to the VDCs of the PEUs in the data area 502, and sort the VDC distribution to generate a sorted VDC distribution (see FIG. 9). Then, on the sorted VDC distribution, a slope value of a line segment corresponding to the PEUs having the VDC between the first predetermined value and the second predetermined value is calculated. In particular, the MMC 502 then determines whether the slope value is less than one slope threshold. If the slope value is less than the slope threshold, the MMC 502 determines that the number of the PEUs having the VDC between the first predetermined value and the second predetermined value meets the predetermined condition, and selects the PEU from the PEUs having the VDC between the first predetermined value and the second predetermined value for performing the GCO. On the contrary, if the slope value is not less than the slope threshold, the MMC 502 determines that the number of the PEUs having the VDC does not meet the predetermined condition, and selects the PEUs having the smallest VDC for performing the GCO. Herein, the slope threshold is T and set as 0.8. Nevertheless, it should be understood that the invention is not limited to the above. In another exemplary embodiment, T may also be set to be 0.5, between 0.5 and 0.8, between 0.8 and 0.9, 0.9 or other suitable values.

Figure 10:
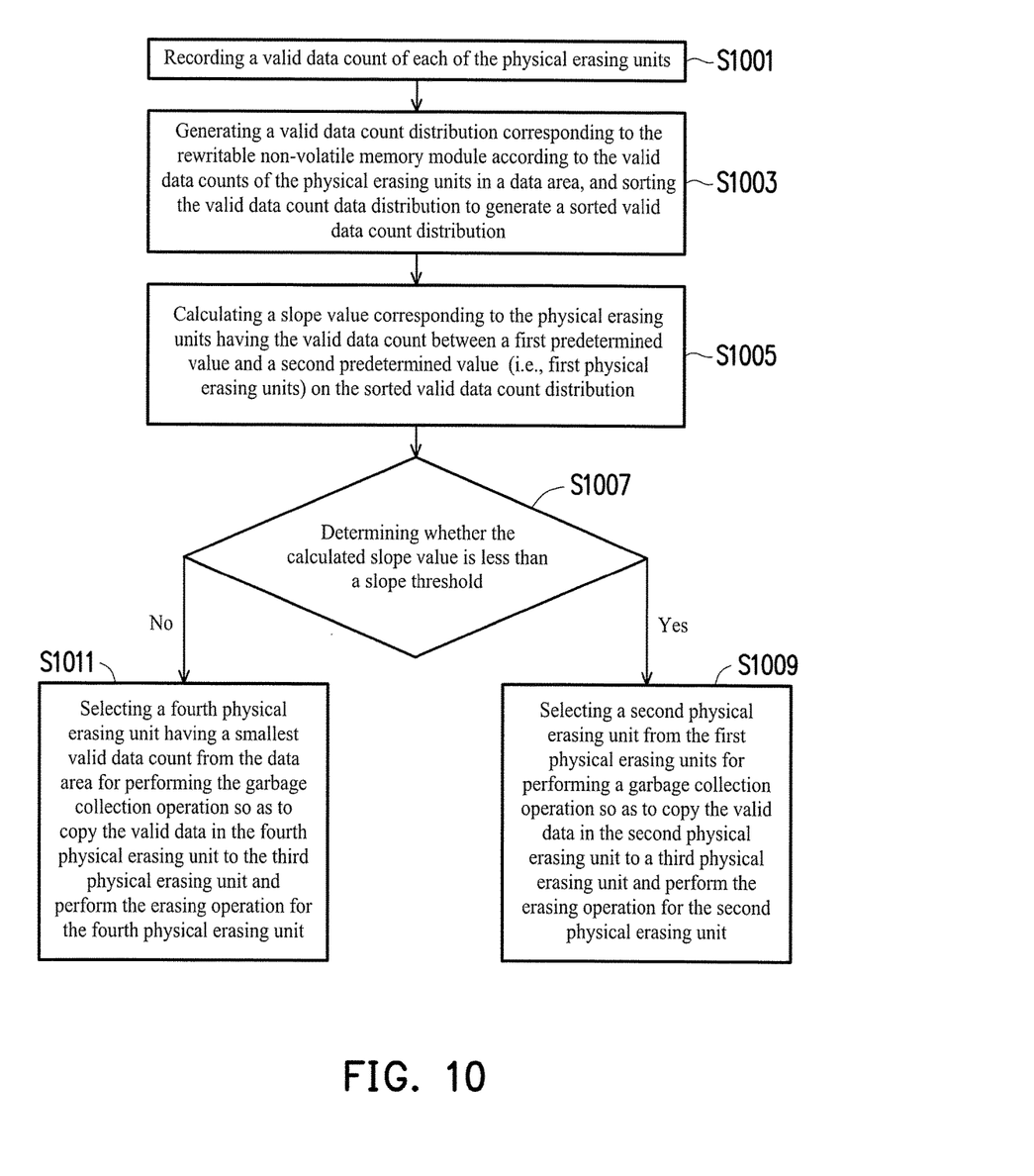
FIG. 10 is a flowchart illustrating a memory management method according to an exemplary embodiment.

FIG. 10 is a flowchart illustrating a memory management method according to an exemplary embodiment.

With reference to FIG. 10, in step S1001, the MMC 502 records a VDC of each PEU.

In step S1003, the MMC 502 generates a VDC distribution corresponding to the RNVM module 406 according to the VDCs of the PEUs in a data area, and sort the VDC distribution to generate a sorted VDC distribution. Then, in step S1005, the MMC 502 calculates a slope value corresponding to the PEUs having the VDC between a first predetermined value and a second predetermined value (i.e., first PEUs) on the sorted VDC distribution, and the MMC 502 then determines whether the calculated slope value is less than a slope threshold in step S1007.

If the calculated slope value is less than the slope threshold, in step S1009, the MMC 502 selects a second PEU from the first PEUs for performing a GCO so as to copy the valid data in the second PEU to a third PEU and perform the erasing operation for the second PEU.

If the calculated slope value is not less than the slope threshold, in step S1011, the MMC 502 selects a fourth PEU having the smallest VDC from the data area 602 for performing the GCO so as to copy the valid data in the fourth PEU to the third PEU and perform the erasing operation for the fourth PEU.

It should be understood that, calculating the slope value corresponding to the PEUs having the VDC between the first predetermined value and the second predetermined value using the sorted VDC distribution is merely an example, and the present invention is not limited thereto. In another exemplary embodiment, the MMC 502 may also estimate said slope value by dividing the number of the PEUs having the VDC between the first predetermined value and the second predetermined value by the number of the PEUs initially reserved in the spare area 604. Specifically, as described above, before the memory storage apparatus 10 leaves the factory, manufacturers will perform the formatting operation for the memory storage apparatus 10 using the MP tool so as to perform the initialization for the data area 602, the spare area 604, the system area 606 and the replacement area 608. The PEUs in the data area 602 refer to a user capacity of the memory storage apparatus 10, and the PEUs in the spare area 604 are used for alternating the PEUs in the data 602. If there are more PEUs having the VDC between the first predetermined value and the predetermined value, it means that there will be fewer available PEUs in the spare area 604, and a used ratio may be obtained by dividing the number of the PEUs having the VDC between the first predetermined value and the second predetermined value by the number of the PEUs initially reserved in the spare area 604.

Figure 11:
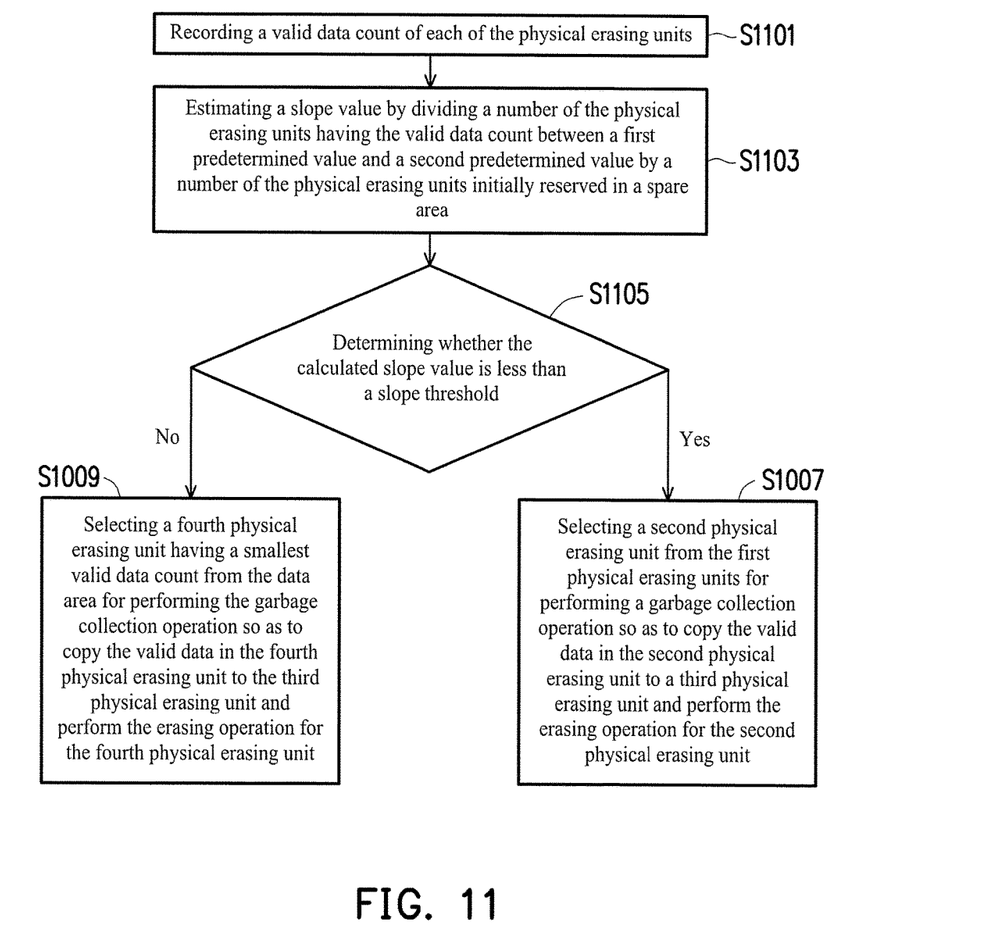
FIG. 11 is a flowchart illustrating a memory management method according to another exemplary embodiment.

FIG. 11 is a flowchart illustrating a memory management method according to another exemplary embodiment.

With reference to FIG. 11, in step S1101, the MMC 502 records a VDC of each PEU.

In step S1103, the MMC 502 estimates a slope value by dividing the number of the PEUs having the VDC between a first predetermined value and a second predetermined value by the number of the PEUs initially reserved in the spare area 604. Then, in step S1105, the MMC 502 determines whether the calculated slope value is less than a slope threshold.

If the calculated slope value is less than the slope threshold, in step S1107, the MMC 502 selects a second PEU from the first PEUs for performing a GCO so as to copy the valid data in the second PEU to a third PEU and perform the erasing operation for the second PEU.

If the calculated slope value is not less than the slope threshold, in step S1109, the MMC 502 selects a fourth PEU having the smallest VDC from the data area 602 for performing the GCO, so as to copy the valid data in the fourth PEU to the third PEU and perform the erasing operation for the fourth PEU.

In summary, according to the memory management method of the forgoing exemplary embodiments, the PEUs not having the smallest VDC are selected for performing the GCO according to a distributed condition of the VDCs for each PEU. As a result, the PEUs may be prevented from being ineffectively used due to the part of the PPUs stored with the valid data, so as to improve the writing performance and extend the lifetime of the rewritable non-volatile memory.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module has a plurality of physical erasing units, each physical erasing unit among the physical erasing units has a plurality of physical programming units, the memory management method comprising:
   recording a valid data count of each physical erasing unit among the physical erasing units;
   identifying a plurality of first physical erasing units among the physical erasing units, wherein the valid data count of each first physical erasing unit among the first physical erasing units is between a first predetermined value and a second predetermined value; and
   selecting a second physical erasing unit from the first physical erasing units if a number of the first physical erasing units meets a predetermined condition, copying a plurality of valid data in the second physical erasing unit to a third physical erasing unit among the physical erasing units, and performing an erasing operation for the second physical erasing unit.

2. The memory management method as recited in claim 1, further comprising:
   at least grouping the physical erasing units into a data area and a spare area; and
   selecting the third physical erasing unit from the spare area,
   wherein the first physical erasing units are grouped into the data area.

3. The memory management method as recited in claim 2, further comprising:
   selecting a fourth physical erasing unit from the data area if the number of the first physical erasing units does not meet the predetermined condition, copying a plurality of valid data in the fourth physical erasing unit to the third physical erasing unit among the physical erasing units, and performing the erasing operation for the fourth physical erasing unit, wherein the valid data count of the fourth physical erasing unit is less than the valid data counts of other physical erasing units in the data area.

4. The memory management method as recited in claim 3, further comprising:
   generating a valid data count distribution corresponding to the rewritable non-volatile memory module according to the valid data counts of the physical erasing units in the data area;
   sorting the valid data count distribution to generate a sorted valid data count distribution;
   calculating a slope value corresponding to the first physical erasing units on the sorted valid data count distribution;
   determining whether the slope value is less than a slope threshold;
   determining that the number of the first physical erasing units meets the predetermined condition if the slope value is less than the slope threshold; and
   determining that the number of the first physical erasing units does not meet the predetermined condition if the slope value is not less than the slope threshold.

5. The memory management method as recited in claim 3, further comprising:
   dividing the number of the first physical erasing units by a number of the physical erasing units initially reserved in the spare area to obtain a slope value;
   determining whether the slope value is less than a slope threshold;
   determining that the number of the first physical erasing units meets the predetermined condition if the slope value is less than the slope threshold; and
   determining that the number of the first physical erasing units does not meet the predetermined condition if the slope value is not less than the slope threshold.

6. The memory management method as recited in claim 4, wherein the slope threshold is T, and $0.5 \leq T \leq 0.9$.

7. The memory management method as recited in claim 6, wherein the slope threshold is 0.8.

8. The memory control circuit unit as recited in claim 7, wherein
   the memory management circuit selects a fourth physical erasing unit from the data area if the number of the first physical erasing units does not meet the predetermined condition, gives a command sequence for copying a plurality of valid data in the fourth physical erasing unit to the third physical erasing unit among the physical erasing units, and performs the erasing operation for the fourth physical erasing unit, wherein the valid data count of the fourth physical erasing unit is less than the valid data counts of other physical erasing units in the data area.

9. The memory control circuit unit as recited in claim 6, wherein the memory management circuit is further configured to at least group the physical erasing units into a data area and a spare area,
   wherein the memory management circuit selects the third physical erasing unit from the spare area,
   wherein the first physical erasing units are grouped into the data area.

10. A memory control circuit unit for controlling a rewritable non-volatile memory module, the memory control circuit unit comprising:
    a host interface, configured to couple to a host system;
    a memory interface, configured to couple to a rewritable non-volatile memory module, wherein the rewritable non-volatile memory module has a plurality of physical erasing units, and each physical erasing unit among the physical erasing units has a plurality of physical programming units; and a memory management circuit, coupled to the host interface and the memory interface;

wherein the memory management circuit is configured to record a valid data count of each physical erasing unit among the physical erasing units, wherein the memory management circuit is further configured to identify a plurality of first physical erasing units among the physical erasing units, wherein the valid data count of each first physical erasing unit among the first physical erasing units is between a first predetermined value and a second predetermined value, wherein the memory management circuit is further configured to select a second physical erasing unit from the first physical erasing units if a number of the first physical erasing units meets a predetermined condition, give a command sequence for copying a plurality of valid data in the second physical erasing unit to a third physical erasing unit among the physical erasing units, and perform an erasing operation for the second physical erasing unit.

11. The memory control circuit unit as recited in claim 10, wherein the memory management circuit is further configured to generate a valid data count distribution corresponding to the rewritable non-volatile memory module according to the valid data counts of the physical erasing units in the data area, and sort the valid data count distribution to generate a sorted valid data count distribution, wherein the memory management circuit is further configured to calculate a slope value corresponding to the first physical erasing units on the sorted valid data count distribution, and determine whether the slope value is less than a slope threshold, wherein the memory management circuit determines that the number of the first physical erasing units meets the predetermined condition if the slope value is less than the slope threshold; and wherein the memory management circuit determines that the number of the first physical erasing units does not meet the predetermined condition if the slope value is not less than the slope threshold.

12. The memory control circuit unit as recited in claim 10, wherein the memory management circuit is further configured to divide the number of the first physical erasing units by a number of the physical erasing units initially reserved in the spare area to obtain a slope value, and determine whether the slope value is less than a slope threshold, wherein the memory management circuit determines that the number of the first physical erasing units meets the predetermined condition if the slope value is less than the slope threshold; and wherein the memory management circuit determines that the number of the first physical erasing units does not meet the predetermined condition if the slope value is not less than the slope threshold.

13. The memory control circuit unit as recited in claim 11, wherein the slope threshold is T, and $0.5 \leq T \leq 0.9$.

14. A memory storage apparatus, comprising:

a connection interface unit, configured to couple to a host system;

a rewritable non-volatile memory module, having a plurality of physical erasing units, each physical erasing unit among the physical erasing units having a plurality of physical programming units; and a memory control circuit unit, coupled to the connection interface unit and the rewritable non-volatile memory module, wherein the memory control circuit unit is configured to record a valid data count of each physical erasing unit among the physical erasing units, wherein the memory control circuit unit is further configured to identify a plurality of first physical erasing units among the physical erasing units, wherein the valid data count of each first physical erasing unit among the first physical erasing units is between a first predetermined value and a second predetermined value, wherein the memory control circuit unit is further configured to select a second physical erasing unit from the first physical erasing units if a number of the first physical erasing units meets a predetermined condition, copy a plurality of valid data in the second physical erasing unit to a third physical erasing unit among the physical erasing units, and perform an erasing operation for the second physical erasing unit.

15. The memory storage apparatus as recited in claim 14, wherein the memory management circuit is further configured to at least group the physical erasing units into a data area and a spare area, wherein the memory control circuit unit selects the third physical erasing unit from the spare area, wherein the first physical erasing units are grouped into the data area.

16. The memory storage apparatus as recited in claim 15, wherein the memory control circuit unit selects a fourth physical erasing unit from the data area if the number of the first physical erasing units does not meet the predetermined condition so as to copy a plurality of valid data in the fourth physical erasing unit to the third physical erasing unit among the physical erasing units, and performs the erasing operation for the fourth physical erasing unit, wherein the valid data count of the fourth physical erasing unit is less than the valid data counts of other physical erasing units in the data area.

17. The memory storage apparatus as recited in claim 16, wherein the memory control circuit unit is further configured to generate a valid data count distribution corresponding to the rewritable non-volatile memory module according to the valid data counts of the physical erasing units in the data area, and sort the valid data count distribution to generate a sorted valid data count distribution, wherein the memory control circuit unit is further configured to calculate a slope value corresponding to the first physical erasing units on the sorted valid data count distribution, and determine whether the slope value is less than a slope threshold, wherein the memory control circuit unit determines that the number of the first physical erasing units meets the predetermined condition if the slope value is less than the slope threshold; and wherein the memory management circuit determines that the number of the first physical erasing units does not meet the predetermined condition if the slope value is not less than the slope threshold.

18. The memory storage apparatus as recited in claim 16, wherein the memory control circuit unit is further configured to divide the number of the first physical erasing units by a number of the physical erasing units initially reserved in the spare area to obtain a slope value, and determine whether the slope value is less than a slope threshold, wherein the memory control circuit unit determines that the number of the first physical erasing units meets the predetermined condition if the slope value is less than the slope threshold; and wherein the memory control circuit unit determines that the number of the first physical erasing units does not meet the predetermined condition if the slope value is not less than the slope threshold.

19. The memory storage apparatus as recited in claim 17, wherein the slope threshold is T, and $0.5 \leq T \leq 0.9$.

20. The memory storage apparatus as recited in claim 19, wherein the slope threshold is 0.8.

* * * * *